(12) United States Patent
Havens et al.

(10) Patent No.: US 7,364,081 B2
(45) Date of Patent: Apr. 29, 2008

(54) METHOD AND APPARATUS FOR READING UNDER SAMPLED BAR CODE SYMBOLS

(75) Inventors: William H. Havens, Syracuse, NY (US); Andrew Longacre, Jr., Skaneateles, NY (US); Dennis W. McEnery, Marcellus, NY (US); Thomas Hawley, Skaneateles, NY (US); Ynjiun Wang, Cupertino, CA (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 484 days.

(21) Appl. No.: 11/001,776

(22) Filed: Dec. 2, 2004

(65) Prior Publication Data

US 2005/0145698 A1    Jul. 7, 2005

Related U.S. Application Data

(60) Provisional application No. 60/526,366, filed on Dec. 2, 2003.

(51) Int. Cl.
  *G06K 7/10* (2006.01)
  *G06K 9/36* (2006.01)
  *G06K 9/80* (2006.01)
  *G06K 15/12* (2006.01)

(52) U.S. Cl. .............. 235/462.1; 235/462.11; 235/462.41

(58) Field of Classification Search .......... 235/462.1, 235/462.11, 462.12, 462.25, 462.41; 382/181
See application file for complete search history.

(56) References Cited

U.S. PATENT DOCUMENTS

| | | | |
|---|---|---|---|
| 4,897,880 A | 1/1990 | Wilber et al. | |
| 5,113,445 A | 5/1992 | Wang | |
| 5,138,140 A | 8/1992 | Siemiatkowski et al. | |
| 5,155,343 A * | 10/1992 | Chandler et al. | 235/462.09 |
| 5,233,169 A | 8/1993 | Longacre, Jr. | |
| 5,243,655 A | 9/1993 | Wang | |
| 5,276,315 A * | 1/1994 | Surka | 235/462.1 |
| 5,286,960 A | 2/1994 | Longacre, Jr. et al. | |
| 5,291,008 A | 3/1994 | Havens et al. | |
| 5,294,783 A | 3/1994 | Hammond, Jr. et al. | |
| 5,304,787 A | 4/1994 | Wang | |
| 5,337,361 A | 8/1994 | Wang et al. | |
| 5,393,965 A | 2/1995 | Bravman et al. | |
| 5,399,846 A | 3/1995 | Pavlidis et al. | |
| 5,401,944 A | 3/1995 | Bravman et al. | |
| 5,422,744 A | 6/1995 | Katz et al. | |
| 5,455,414 A | 10/1995 | Wang | |
| 5,471,533 A | 11/1995 | Wang et al. | |
| 5,477,042 A | 12/1995 | Wang | |
| 5,481,103 A | 1/1996 | Wang | |
| 5,489,158 A | 2/1996 | Wang et al. | |
| 5,490,217 A | 2/1996 | Wang et al. | |
| 5,504,322 A | 4/1996 | Pavlidis et al. | |
| 5,506,697 A | 4/1996 | Li et al. | |
| 5,512,739 A * | 4/1996 | Chandler et al. | 235/462.09 |

(Continued)

*Primary Examiner*—Jared J. Fureman
(74) *Attorney, Agent, or Firm*—Marjama Muldoon Blasiak & Sullivan LLP

(57) ABSTRACT

The present invention is directed to a method for reading a bar code symbol with an optical reader. The method includes the step of scanning the bar code symbol to obtain a plurality of scan lines. Each of the plurality of scan lines includes a linear array of N-pixel values. Adjacent pixels in the linear array of N-pixel values are separated by a sample separation distance. A reconstructed scan line is generated that interleaves the N-pixel values from selected scan lines of the plurality of scan lines. A reconstructed pixel sample separation distance of adjacent interleaved pixels is an integer fraction of the pixel sample separation distance.

14 Claims, 13 Drawing Sheets

U.S. PATENT DOCUMENTS

| | | |
|---|---|---|
| 5,513,264 A | 4/1996 | Wang et al. |
| 5,521,366 A | 5/1996 | Wang et al. |
| 5,550,365 A * | 8/1996 | Klancnik et al. ...... 235/462.25 |
| 5,563,399 A | 10/1996 | Wang |
| 5,566,245 A | 10/1996 | Zheng et al. |
| 5,572,006 A | 11/1996 | Wang et al. |
| 5,610,995 A | 3/1997 | Zheng et al. |
| 5,637,849 A | 6/1997 | Wang et al. |
| 5,644,408 A | 7/1997 | Li et al. |
| 5,646,390 A | 7/1997 | Wang et al. |
| 5,659,167 A | 8/1997 | Wang et al. |
| 5,691,773 A | 11/1997 | Wang et al. |
| 5,702,059 A | 12/1997 | Chu et al. |
| 5,703,349 A | 12/1997 | Meyrson et al. |
| 5,710,419 A | 1/1998 | Wang et al. |
| 5,714,745 A | 2/1998 | Ju et al. |
| 5,717,195 A | 2/1998 | Feng et al. |
| 5,719,384 A | 2/1998 | Ju et al. |
| 5,736,724 A | 4/1998 | Ju et al. |
| 5,739,518 A | 4/1998 | Wang |
| 5,742,263 A | 4/1998 | Wang et al. |
| 5,748,780 A | 5/1998 | Stolfo |
| 5,760,382 A | 6/1998 | Li et al. |
| 5,763,864 A | 6/1998 | O'Hagan et al. |
| 5,773,810 A | 6/1998 | Hussey et al. |
| 5,783,811 A | 7/1998 | Feng et al. |
| 5,784,102 A | 7/1998 | Hussey et al. |
| 5,793,033 A | 8/1998 | Feng et al. |
| 5,811,774 A | 9/1998 | Ju et al. |
| 5,811,784 A | 9/1998 | Tausch et al. |
| 5,814,801 A | 9/1998 | Wang et al. |
| 5,815,200 A | 9/1998 | Ju et al. |
| 5,818,023 A | 10/1998 | Meyerson et al. |
| 5,818,028 A | 10/1998 | Meyerson et al. |
| 5,831,674 A | 11/1998 | Ju et al. |
| 5,834,754 A | 11/1998 | Feng et al. |
| 5,848,426 A | 12/1998 | Wang et al. |
| 5,914,476 A | 6/1999 | Gerst, III et al. |
| 5,936,224 A | 8/1999 | Shimizu et al. |
| 5,949,052 A | 9/1999 | Longacre, Jr. et al. |
| 5,949,054 A | 9/1999 | Karpen et al. |
| 5,966,463 A | 10/1999 | Wang |
| 5,974,202 A | 10/1999 | Wang et al. |
| 5,979,763 A | 11/1999 | Wang et al. |
| 6,002,491 A | 12/1999 | Li et al. |
| 6,019,286 A | 2/2000 | Li et al. |
| 6,053,407 A | 4/2000 | Wang et al. |
| 6,129,278 A | 10/2000 | Wang et al. |
| 6,188,804 B1 | 2/2001 | Weldy et al. |
| 6,264,105 B1 * | 7/2001 | Longacre et al. ........ 235/462.1 |
| 6,271,876 B1 | 8/2001 | McIntyre et al. |
| 6,298,175 B1 | 10/2001 | Longacre, Jr. et al. |
| 6,298,176 B2 | 10/2001 | Longacre, Jr. et al. |
| 6,343,740 B1 | 2/2002 | Ju et al. |
| 6,491,223 B1 | 12/2002 | Longacre, Jr. et al. |
| 6,561,428 B2 | 5/2003 | Meier et al. |
| 6,561,612 B2 | 5/2003 | Minckler |
| 6,572,017 B1 * | 6/2003 | Stoner ................... 235/462.12 |
| 6,575,367 B1 | 6/2003 | Longcre, Jr. |
| 6,601,768 B2 | 8/2003 | McCall et al. |
| 6,612,676 B1 | 9/2003 | Minckler |
| 6,681,029 B1 | 1/2004 | Rhoads |
| 6,698,656 B2 | 3/2004 | Parker et al. |
| 6,700,990 B1 | 3/2004 | Rhoads |
| 6,739,511 B2 | 5/2004 | Tsikos et al. |
| 6,760,463 B2 | 7/2004 | Rhoads |
| 6,814,290 B2 * | 11/2004 | Longacre ................. 235/462.1 |
| 6,832,725 B2 | 12/2004 | Gardiner et al. |
| 6,834,807 B2 | 12/2004 | Ehrhart et al. |
| 6,847,910 B2 | 1/2005 | Kobayashi |
| 6,857,570 B2 | 2/2005 | Tsikos et al. |
| 7,219,841 B2 * | 5/2007 | Biss et al. ............. 235/462.25 |
| 2002/0080239 A1 | 6/2002 | Ikeda et al. |
| 2003/0042315 A1 | 3/2003 | Tsikos et al. |
| 2003/0218070 A1 | 11/2003 | Tsikos et al. |
| 2004/0164165 A1 | 8/2004 | Havens et al. |
| 2004/0206914 A1 | 10/2004 | Schomacker et al. |
| 2005/0173538 A1 * | 8/2005 | Tsukuda et al. ....... 235/462.25 |

* cited by examiner

Temp1

METHOD AND APPARATUS FOR READING UNDER SAMPLED BAR CODE SYMBOLS

CROSS REFERENCES TO RELATED APPLICATIONS

The present application claims the priority, under 35 U.S.C. § 119 of U.S. Provisional Patent Application No. 60/526,366 filed Dec. 2, 2003. The disclosure of the above provisional application is incorporated herein by reference in its entirety.

BACKGROUND OF THE INVENTION

The present invention relates generally to bar code readers, and particularly to bar code readers with improved spatial resolution.

DESCRIPTION OF THE PRIOR ART

Many bar code readers have the ability to optically resolve bar code symbol features having narrow symbol elements. However, the bar code reader may not have sufficient spatial resolution to actually capture these narrow symbol elements. Those of ordinary skill in the art will recognize that insufficient spatial resolution is very different in nature than insufficient optical resolution. The bar code reader must have adequate optical resolution and adequate spatial resolution to read a bar code symbol properly. A lack of either one may result in a non-read.

Spatial resolution refers to a situation wherein the distance between pixels in a scanned line, e.g., pixel sample separation, is not small enough vis á vis the narrowest bar code symbol elements. Insufficient spatial resolution may result when the pixel sample separation is greater than or substantially approaches the width of the image of the narrowest bar code symbol feature. Another way of thinking about spatial resolution is by adapting Nyquist's theorem to bar code sampling rates. If the bar code symbol has no spatial frequency components higher than (Wcycles/unit distance), the bar code symbol may be completely described by obtaining sample values at locations separated by (½ W) times the unit distance. In other words, the bar code must be sampled at a spatial rate that is greater than or equal to 2 W per unit distance.

There are several reasons why the imager in a given bar code reader lacks sufficient spatial resolution. First, the bar code reader may be positioned at an excessive distance from the bar code symbol. This problem may be exacerbated by the need for a wide field of view in close proximity to the scanner. Second, bar code symbols are becoming increasingly smaller. Bar code symbols are currently being used on products that have limited surface area available for use. For example, bar codes are being used to identify printed circuit boards and semiconductor products. In order to fit in an extremely small area, the bar code symbol must be extremely small.

Therefore, what is needed is a method for reconstructing a high resolution scanning line from a plurality of under-sampled, degraded, or noisy scan lines.

SUMMARY OF THE INVENTION

The present invention addresses the needs described above. The present invention provides a system and method for reconstructing a high resolution scanning line from a plurality of under-sampled, degraded, or noisy scan lines. Thus, the present invention also opens up the possibility of substituting expensive, high resolution imaging components with cruder and cheaper imaging components.

One aspect of the present invention is directed to a method for reading a bar code symbol with an optical reader. The method includes the step of scanning the bar code symbol to obtain a plurality of scan lines. Each of the plurality of scan lines includes a linear array of I-pixel values. Adjacent pixels in the linear array of I-pixel values are separated by a sample separation distance. A reconstructed scan line is generated that interleaves the I-pixel values from selected scan lines of the plurality of scan lines. A reconstructed pixel sample separation distance of adjacent interleaved pixels is an integer fraction of the pixel sample separation distance.

In another aspect, the present invention is directed to a system for reading a bar code symbol with an optical reader. The bar code symbol includes a plurality of bar code features. The system includes an imaging assembly that is configured to scan the bar code symbol to obtain a plurality of scan lines. Each of the plurality of scan lines includes a linear array of I-pixel values. Adjacent pixels in the linear array of I-pixel values are separated by a sample separation distance. A processor is coupled to the imaging assembly. The processor is programmed to generate a reconstructed scan line that interleaves the I-pixel values from selected scan lines of the plurality of scan lines. A reconstructed pixel sample separation distance of adjacent interleaved pixels is an integer fraction of the pixel sample separation distance.

In yet another aspect, the present invention includes a method for reading a bar code symbol with an optical reader. The optical reader includes a two-dimensional imager. The method includes the step of scanning the bar code symbol to obtain a plurality of scan lines. Each of the plurality of scan lines includes a linear array of I-pixel values. Adjacent pixels in the linear array of I-pixel values are separated by a sample separation distance. One of the plurality of scan lines is designated as a reference scan line. N-interpolated data points are inserted between each adjacent pixel pair in each of the plurality of scan lines at equally spaced sub-pixel positions to form an interpolated reference line and a plurality of interpolated scan lines. Each interpolated line includes I(N+1) sub-pixel values. The data point separation distance between sub-pixel values is substantially equal to the sample separation distance divided by N+1. N is an integer value. An optimum delay value is determined for each interpolated scan line. The optimum delay value yields a cross-correlation maximum for the cross-correlation calculation of the interpolated scan line and the interpolated reference line. N-selected interpolated scan lines are chosen from the plurality of interpolated scan lines. A spatial shift amount is selected for each selected interpolated scan line. The spatial shift amount is the integer multiple of the sample separation distance that corresponds to the optimum delay value for the selected interpolated scan line. Each of the N-selected interpolated scan lines is shifted relative to the interpolated reference line by its corresponding spatial shift amount to obtain (N+1) shifted scan lines.

In yet another aspect, the present invention includes a method for reading a bar code symbol with an optical reader, the optical reader including a two-dimensional imager. The method includes the step of acquiring a two-dimensional image of the bar code symbol. A plurality of lines are selected from the two-dimension image. Each of the plurality of scan lines includes a linear array of I-pixel values. Adjacent pixels in the linear array of I-pixel values are separated by a sample separation distance. One of the plurality of scan lines is designated as a reference scan line.

N-interpolated data points are inserted between each adjacent pixel pair in each of the plurality of scan lines at equally spaced sub-pixel positions to form an interpolated reference line and a plurality of interpolated scan lines. Each interpolated line includes I(N+1) sub-pixel values. The data point separation distance between sub-pixel values is substantially equal to the sample separation distance divided by N+1. N is an integer value. An optimum delay value is determined for each interpolated scan line. The optimum delay value yields a cross-correlation maximum for the cross-correlation calculation of the interpolated scan line and the interpolated reference line. N-selected interpolated scan lines are chosen from the plurality of interpolated scan lines. A spatial shift amount is selected for each selected interpolated scan line. The spatial shift amount is the integer multiple of the sample separation distance that corresponds to the optimum delay value for the selected interpolated scan line. Each of the N-selected interpolated scan lines is shifted relative to the interpolated reference line by its corresponding spatial shift amount to obtain (N+1) shifted scan lines.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE INVENTION

Reference will now be made in detail to the present exemplary embodiments of the invention, examples of which are illustrated in the accompanying drawings. Wherever possible, the same reference numbers will be used throughout the drawings to refer to the same or like parts.

Figure 1:
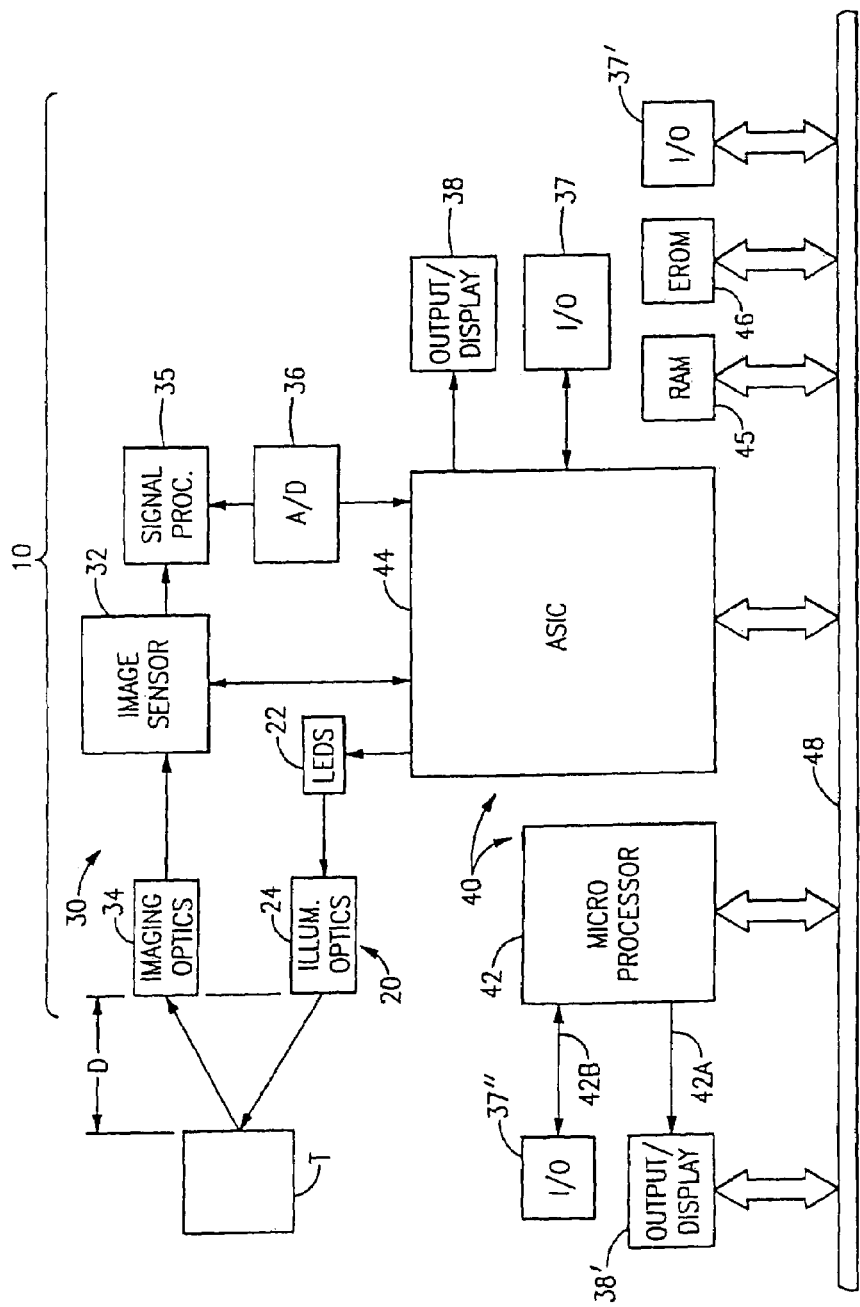
FIG. 1 is a block diagram of an optical reader in accordance with one embodiment of the present invention.

An embodiment of the optical reader of the present invention is shown in FIG. 1, and is designated generally throughout by reference numeral 10.

In accordance with the invention, the present invention is directed to a system and method for reading a bar code symbol with an optical reader. The method includes the step of scanning the bar code symbol to obtain a plurality of scan lines. Each of the plurality of scan lines includes a linear array of I-pixel values. Adjacent pixels in the linear array of I-pixel values are separated by a sample separation distance. A reconstructed scan line is generated that interleaves the I-pixel values from selected scan lines of the plurality of scan lines. A reconstructed pixel sample separation distance of adjacent interleaved pixels is an integer fraction of the pixel sample separation distance. The present invention provides a system and method for reconstructing a high resolution scanning line from a plurality of under-sampled, degraded, or noisy scan lines. Thus, the present invention also opens up the possibility of substituting expensive, high resolution imaging components with cruder and cheaper imaging components.

As embodied herein, and depicted in FIG. 1, a block diagram of an optical reader 10 in accordance with one embodiment of the present invention is depicted. FIG. 1 shows the basic structures that together comprise the general form of an optical reader that uses a 2D image sensor. However, the present invention is equally applicable to readers that use 1D or 2D image sensors, and to readers that use sensors of either type to read both 1D and 2D symbols.

Referring first to FIG. 1, the optical reader of the invention includes an illumination assembly 20 for illuminating a target object T, such as a 1D or 2D bar code symbol, and an imaging assembly 30 for receiving an image of object T and generating an electrical output signal indicative of the data optically encoded therein. Illumination assembly 20 may, for example, include an illumination source assembly 22, such as one or more LEDs, together with an illuminating optics assembly 24, such as one or more reflectors, for directing light from light source 22 in the direction of target object T. Illumination assembly 20 may be eliminated, if ambient light levels are certain to be high enough to allow high quality images of object T to be taken. Imaging assembly 30 may include an image sensor 32, such as a 1D or 2D CCD, CMOS, NMOS, PMOS, CID or CMD solid state image sensor, together with an imaging optics assembly 34 for receiving and focusing an image of object T onto image sensor 32. As noted above, the method of the present invention may be used to compensate for inexpensive, low-end imaging components. For example, in one embodiment, imaging sensor 32 includes 480×640 VGA image sensor device.

Optical reader 10 of FIG. 1 also includes programmable control means 40 which preferably comprises an integrated circuit microprocessor 42 and an application specific integrated circuit or ASIC 44. Processor 42 and ASIC 44 are both programmable control devices which are able to receive, output and process data in accordance with a stored program stored in either or both of a read/write random access memory or RAM 45 and an erasable read only memory or EROM 46. Processor 42 and ASIC 44 are also both connected to a common bus 48 through which program data and working data, including address data, may be received and transmitted in either direction to any circuitry that is also connected thereto. Processor 42 and ASIC 44 differ from one another, however, in how they are made and how they are used.

More particularly, processor 42 is preferably a general purpose, off-the-shelf VLSI integrated circuit microprocessor which has overall control of the circuitry of FIG. 1, but which devotes most of its time to decoding image data stored in RAM 45 in accordance with program data stored in EROM 46. ASIC 44, on the other hand, is preferably a special purpose VLSI integrated circuit, such as a programmable logic or gate array, which is programmed to devote its time to functions other than decoding image data, and thereby relieve processor 42 from the burden of performing these functions.

The actual division of labor between processor 42 and ASIC 44 will naturally depend on the type of off-the-shelf microprocessors that are available, the type of image sensor which is used, the rate at which image data is output by imaging assembly 30, etc. There is nothing in principle, however, that requires that any particular division of labor be made between processor 42 and ASIC 44, or even that such a division be made at all. This is because special purpose ASIC 44 may be eliminated entirely if general purpose processor 42 is fast enough and powerful enough to perform all of the functions contemplated by the present invention. It will, therefore, be understood that neither the number of processors used, nor the division of labor therebetween, is of any fundamental significance for purposes of the present invention.

With processor architectures of the type shown in FIG. 1, a typical division of labor between processor 42 and ASIC 44 will be as follows. Processor 42 is preferably devoted primarily to the tasks of decoding image data, once such data has been stored in RAM 45, handling the menuing options and reprogramming functions, and providing overall system level coordination. ASIC 44 is preferably devoted primarily to controlling the image acquisition process, the A/D conversion process and the storage of image data, including the ability to access memories 45 and 46 via a DMA channel. ASIC 44 may also perform many timing and communication operations. ASIC 44 may, for example, control the illumination of LEDs 22, the timing of image sensor 32 and an analog-to-digital (A/D) converter 36, the transmission and reception of data to and from a processor external to reader 10, through an RS-232 (or other) compatible I/O device 37 and the outputting of user perceptible data via an output device 38, such as a beeper, a good read LED and/or a display 39 which may be, for example, a liquid crystal display. Control of output, display and I/O functions may also be shared between processor 42 and ASIC 44, as suggested by bus driver I/O and output/display devices 37' and 38' or may be duplicated, as suggested by microprocessor serial I/O ports 42A and 42B and I/O and display devices 37" and 38". As explained earlier, the specifics of this division of labor is of no significance to the present invention.

Figure 2:
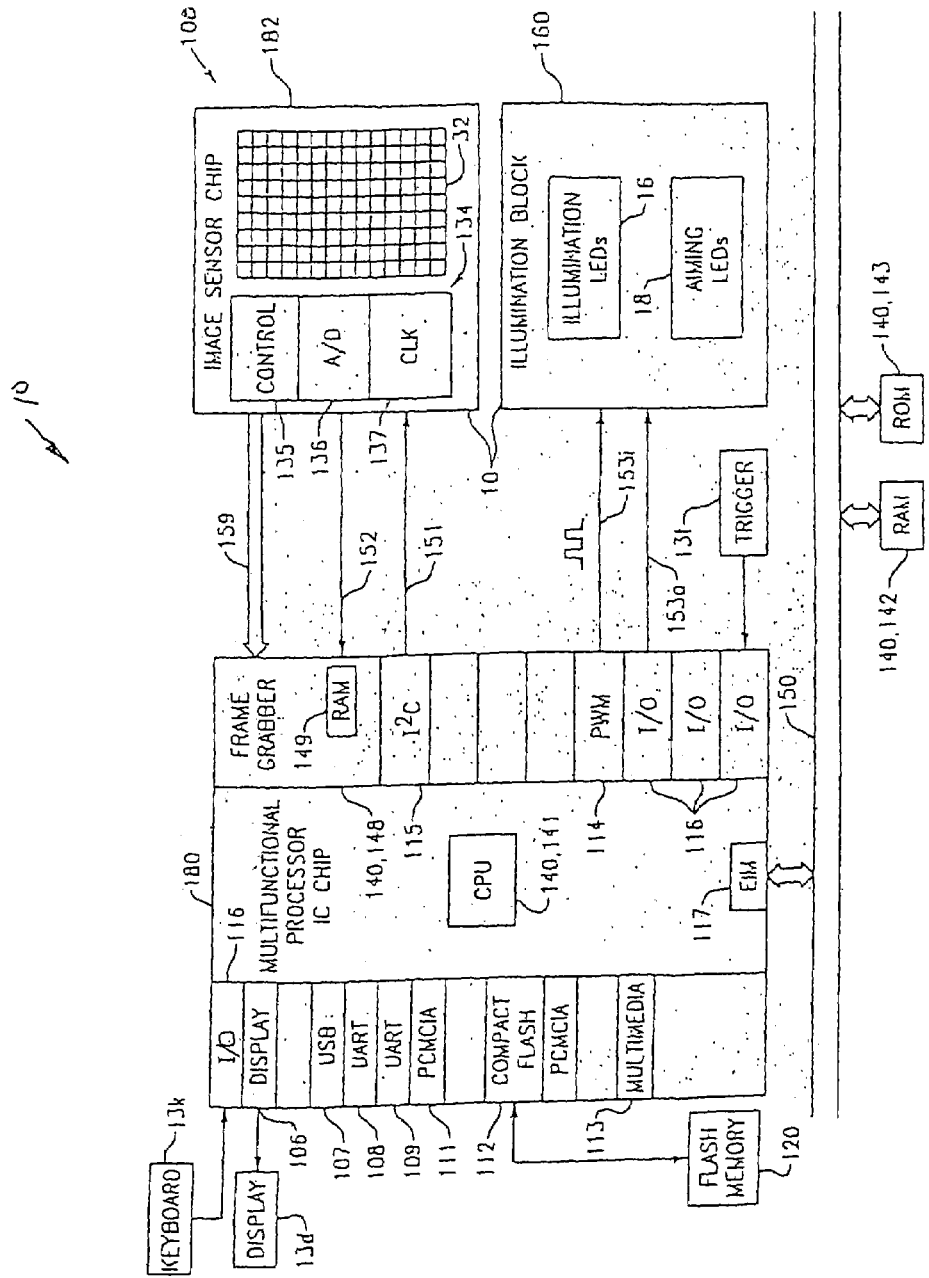
FIG. 2 is a block diagram of an optical reader in accordance with another embodiment of the present invention.

As embodied herein and depicted in FIG. 2, a block diagram of an optical reader 10 in accordance with another embodiment of the present invention is disclosed. This embodiment employs a two-dimensional imager that is more sophisticated than the imager employed in the embodiment of FIG. 1. In the specific embodiment of FIG. 2, electrical circuit 100 includes a control circuit 140 comprising CPU 141, system RAM 142 and system ROM 143 and frame grabber block 148. As shown, CPU 141 and frame grabber block 148 are incorporated in a multi-functional IC chip 180 which in addition to including CPU 141 includes numerous other integrated hardware components. Namely, multifunctional IC chip 180 may include a display control block 106, several general purpose I/O ports 116, several interface blocks such as a USB circuit block 107 and a UART block 108 for facilitating RS 232 communications, a UART block 109 for facilitating infra-red communications (including communication according to standards promulgated by the INFRARED DATA ASSOCIATION$_7$ (IrDA$_7$), a trade association for defining infrared standards), and a pulse width modulation (PWM) output block 110. Multi-functional processor IC chip 180 can also have other interfaces such as a PCMCIA interface 111, a compact flash interface 112, and a multimedia interface 113. If reader 10 includes a display 13d, display 13d may be in communication with chip 180 via display interface 106. Trigger 13t and keypad 13k may be in communication with chip 180 via general purpose I/O interface 116.

Physical form views of readers having displays and keyboards are shown for example in U.S. application Ser. No. 10/137,484, filed May 2, 2002, entitled An Optical Reader Comprising Keyboard, which is hereby incorporated herein by reference in its entirety.

Multi-functional processor IC chip 180 may be one of an available type of multifunctional IC processor chips which are presently available such as a Dragonball MX1 IC processor chip or a Dragonball MXL IC processor chip available from Motorola, a DSC IC chip of the type available from Texas Instruments, an O-Map IC chip of the type available from Texas Instruments, or a multifunctional IC processor chip of a variety known as Clarity SOCs (e.g., system on a chip) available from Sound Vision, Inc.

In one embodiment, multi-functional processor IC chip 180 comprises components that provide at least the functions provided by a CPU 140, system RAM 142 and system ROM 143. In some embodiments, it is advantageous that microprocessor-based decoder module 180 comprises an integrated circuit device having integrated therein a microprocessor, an analog-to-digital converter, a digital-to-analog converter, a direct memory access (DMA) channel, a bi-directional communication line for communication with a sensor such as either or both of line 151 and 152, and a channel for data receipt from a sensor, such as data line 159 that brings data to frame grabber 148. The microprocessor-based IC chip 180 can comprise semiconductor materials, optical materials, and photonic bandgap materials. In some embodiments, it is advantageous that the multi-functional processor IC Chip 180 further comprise I/O 116 suitable to accept user input (for example from a keyboard 13k), interface capability for flash memory devices such as Multimedia (MMC), Smart Media, Compact Flash, and Memory Stick. Other features that may be used to advantage include pulse width modulators (PWMs), serial communication channels (e.g., UARTs, SPIs, and USBs), display drivers and controllers such as for an LCD, wireless communication capability such as Bluetooth and 802.11 (a), (b), and (g)-compatible transmitter/receivers, sequence control modules such as timer banks, sensor controllers, audio generators, audio coder/decoders (codecs), speech synthesizers, and speech recognition hardware and/or software.

Multiple imagers might also be used to create the multiplicity of scan lines. The scan lines from the multiple imagers could then be appropriately aligned using the techniques disclosed in this document.

Frame grabber block 148 of IC chip 180 replaces the function of a frame grabbing field programmable gate array (FPGA) as discussed in commonly assigned application Ser. No. 09/954,081, filed Sep. 17, 2001, entitled "Imaging Device Having Indicia-Controlled Image Parsing Mode," and Ser. No. 09/904,697, filed Jul. 13, 2001, entitled "An Optical Reader Having a Color Imager," both of which are hereby incorporated herein by reference in their entirety. More particularly, frame grabber block 148 is specifically adapted collection of hardware elements programmed to carry out, at video rates or higher, the process of receiving digitized image data from image sensor chip 182 and writing digitized image data to system RAM 142 which in the embodiment shown is provided on a discreet IC chip. Frame grabber block 148 includes hardware elements preconfigured to facilitate image frame capture. Frame grabber block 148 can be programmed by a user to capture images according to a user's system design requirements.

Programming options for programming frame grabber block 148 include options enabling block 148 to be customized to facilitate frame capture that varies in accordance with image sensor characteristics such as image sensor resolution, clockout rating, and fabrication technology (e.g. CCD, CMOS, CID), dimension (1D or 2D), tonality (from 1 to N-bits), color (monochrome or color), biometric features, such as fingerprints, retinal patterns, facial features, and one- and two-dimensional patterns that can provide information, such as chromatography patterns and electrophoretic patterns of mixtures of substances, including substances such as biological samples comprising DNA.

Aspects of the operation of circuit 100 when circuit 100 captures image data into RAM 140 are now described. Circuit 100 can perform a cycle of receiving a frame of image data, performing internal programming functions, and decoding the frame of image data in a time period of less than or equal to a second. In a more preferred embodiment, the circuit 100 performs the cycle in a time period of less than or equal to fraction (1/30) of a second. It is expected that in a still more preferred embodiment, the time period can be less than or equal to fraction (1/270) of a second. When trigger 13t is pulled, CPU 141, under the operation of a program stored in system ROM 143, writes an image capture enable signal to image sensor chip 182 via communication line 151. Line 151, like the remainder of communication lines described herein represents one or more physical communication lines. In the embodiment shown, wherein image sensor chip 182 is of a type available from IC Media Corp., I²C interface 115 of chip 180 is utilized to facilitate communication with chip 182 (if another image sensor chip is selected another type of interface e.g. interface 116 may be utilized). Other types of signals may be sent over line 151 during the course of image capture. Line 151 may carry, for example, timing initialization, gain setting and exposure setting signals. In the embodiment shown, the image sensor chip 182 includes an image sensor 32 that is typically provided by a photosensitive array and further includes an image sensor electrical circuit block 134. The image sensor electrical circuit block 134 includes a control circuit 135 for controlling the image sensor 32, an A/D conversion circuit 136, for converting analog signals received from the image sensor 32 into digital form and an integrated clock 137, sometimes referred to as an oscillator.

When control block 135 of image sensor chip 182 receives an image capture enable instruction, control block 135 sends various signals to frame grabber block 148. Image sensor control block 135 typically sends various types of synchronization signals to frame grabber block 148 during the course of capturing frames of image data. In particular, control block 135 may send to frame grabber block 148 "start of frame signals" which inform frame grabber block 148 that chip 182 is ready to transmit a new frame of image data, "data valid window" signals which indicate periods in which a row of image data is valid, and "data acquisition clock" signals as established by clock 137 controlling the timing of image data capture operations. In the embodiment described, line 152 represents three physical communication lines, each carrying one of the above types of signals.

In an alternative embodiment, vertical and horizontal synchronization signals are processed by frame grabber 148 to internally generate a data valid window signal. Frame grabber block 148 appropriately responds to the respective synchronization signals, by establishing buffer memory locations within integrated RAM 149 of block 148 for temporary storage of the image data received from image sensor chip 182 over data line 159. At any time during the capture of a frame of image data into system RAM 142, buffer RAM 149 of frame grabber block 148 may store a partial (e.g. about 0.1 to 0.8) or a full line of image data.

Referring to further aspects of electrical circuit 100, circuit 100 includes a system bus 150. Bus 150 may be in communication with CPU 141 via a memory interface such as EIM interface 117 of IC chip 180. System RAM 142 and system ROM 143 are also connected to bus 150 and in communication with CPU 141 via bus 150. In the embodiment shown, RAM 142 and ROM 143 are provided by discreet IC chips. System RAM 142 and system ROM 143 could also be incorporated into processor chip 180.

In addition to having system RAM 142, sometimes referred to as "working" RAM, electrical circuit 100 may include one or more long term storage devices. Electrical circuit 100 can include for example a flash memory device 120. Several standardized formats are available for such flash memory devices including: Multimedia (MMC), Smart Media, Compact Flash, and Memory Stick. Flash memory devices are conveniently available in card structures which can be interfaced to CPU 141 via an appropriate slot type electromechanical interface in communication with IC chip 180. Flash memory devices are particularly useful when reader 5 must archive numerous frames of image data. Electrical circuit 100 can also include other types of long term storage such as a hard drive which may be interfaced to bus 150 or to an appropriate I/O interface of processor IC chip 180.

In a further aspect of electrical circuit 100, control circuit 140 is configured to control the turning off and turning on of LEDs 16, 18 of illumination block 160. Control circuit 140 preferably controls illumination block 160 in a manner that is coordinated with the capturing of the frames of image data. Illumination LEDs 16 are typically on during at least a portion of frame capture periods. Configuring circuit 140 so that LEDs 16, 18 have off periods significantly reduces the power consumption of circuit 100.

In a further aspect of the electrical circuit 100, electrical circuit 100 can be configured so that PWM output interface 114 of IC chip 180 controls illumination LEDs of an imaging module such as illumination LEDs 16 of module 10-1 or aiming/illumination LEDs 18 of module 10-2.

In one embodiment, illumination block 160 is in communication with PWM output interface 114 and configured in such manner that LEDs 16 are turned on at a leading edge of PWM pulses output at PWM interface 114, and are turned off at falling edges of PWM pulses output at PWM interface 114. PWM interface 114 should be configured so that several pulses are generated and sent over communication line 153i during the time that a single row of pixels of image data are exposed to light prior to clocking out of pixel values corresponding to that row. Thus, illumination LEDs 16 would be turned on and off several times during the exposure period for exposing a row of pixels to light. Further, the number of pulses output by PWM output 114 during the time that a single row of pixels are exposed should not vary substantially from row to row. The pixel clock signal received at frame grabber block 148 of IC chip 180 can be utilized to generate the PWM output. It can be seen, therefore, that multifunctional IC chip 180 including frame grabber block 148 and PWM output 114 greatly simplifies the task of developing PWM signals for use in controlling illumination LEDs 16 of module 10. In a further aspect of electrical circuit 100, aiming LEDs 18 of circuit 100 can be controlled by a signal transmitted by a general purpose I/O port 116 of IC chip 180 over communication line 153a.

In another embodiment, PWM output 114 and illumination block 160 are configured so that PWM output 114 controls the intensity of illumination, not the on time/off time of illumination. Illumination LED block 160 in such an embodiment can include a power supply circuit which is interfaced to PWM output 114 such that the PWM signal output at PWM output 114 varies the voltage or current supplied to LEDs 16.

In light of the descriptions of FIG. 1 and FIG. 2, those of ordinary skill in the art will understand that the present invention may be implemented in a reader that consists of inexpensive and crude components, or on the other hand, be implemented using state-of-the-art components.

Figure 3A:
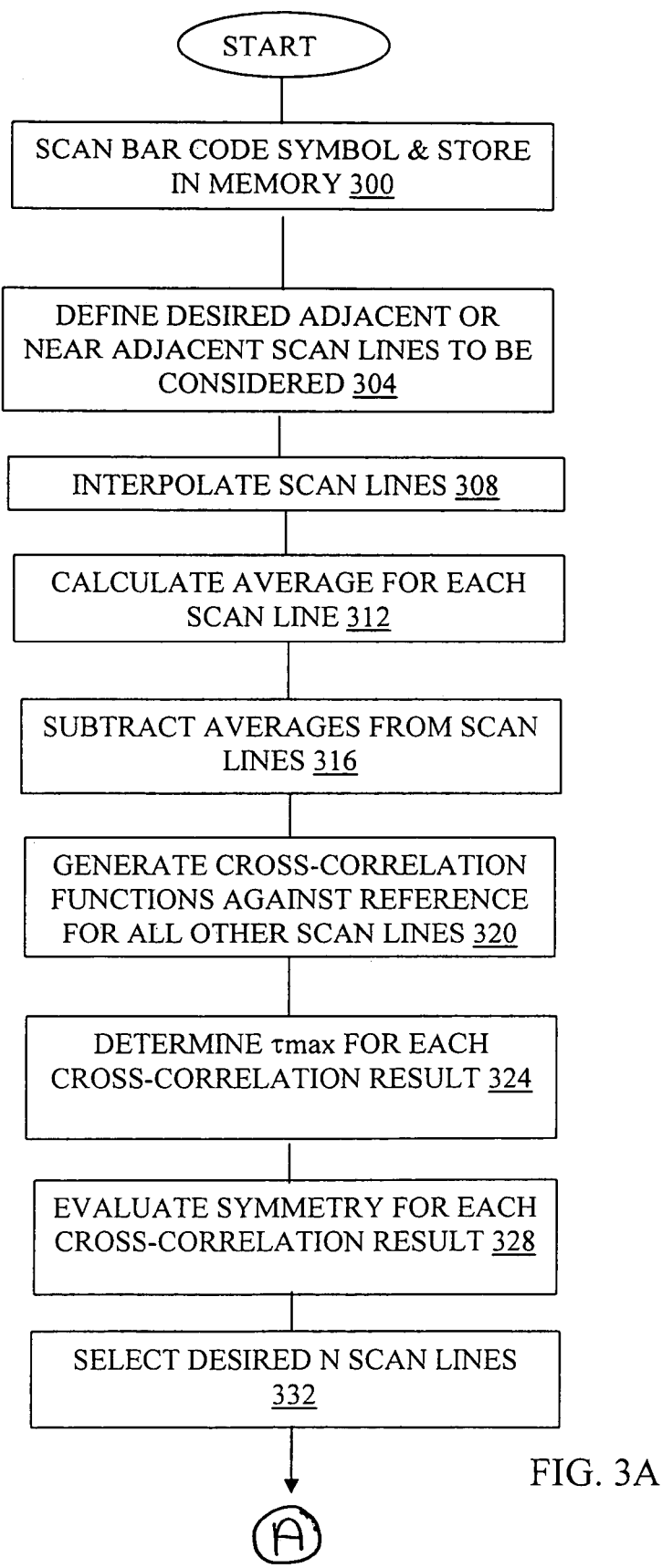
FIGS. 3A-3B are collectively a flow chart showing a method for reading a bar code symbol using under-sampled or degraded scan lines.
Figure 3B:
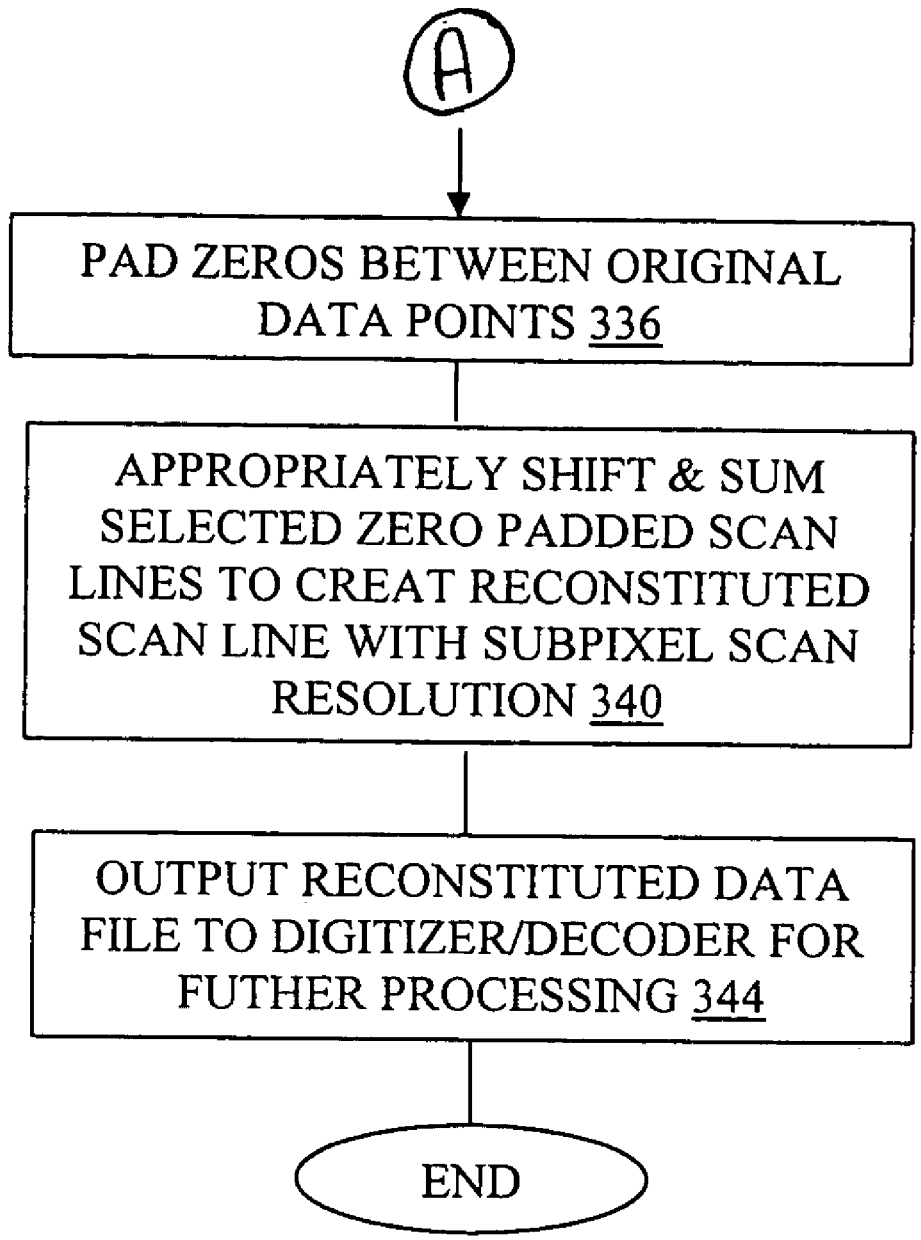

As embodied herein and depicted in FIGS. 3A-3B, a flow chart showing a method for reading a bar code symbol using under-sampled, degraded or noisy scan lines is depicted. When a bar code pattern is under sampled, it becomes impossible to be sure that elements with a width less than the sampling period are distinguished from the adjacent elements. This is because the image of a very narrow bar code symbol element may have a width that is smaller than a pixel separation. In other words, the pixel sample separation between adjacent pixels is greater than or approximately equal to a width of the image of the narrowest bar code symbol feature. However, this problem is addressed by the present invention. A plurality of scan lines are taken with starting points that may be shifted by a fraction of a sample separation, making it possible to obtain information about the narrow elements previously undetected. In performing this task with a 2D imager, it is essential that the axis of the bar code pattern is not perfectly aligned with the axis of the imager. For example this can be accomplished by using adjacent or near adjacent scan lines from a 2D imager.

The cross-correlation function allows one to determine the similarity between the two waveforms in a statistical sense. In this specific case evaluating the cross-correlation function for two under sampled waveforms allows the two waveforms to be optimally aligned, to a fraction of the sampling interval.

Figure 4:
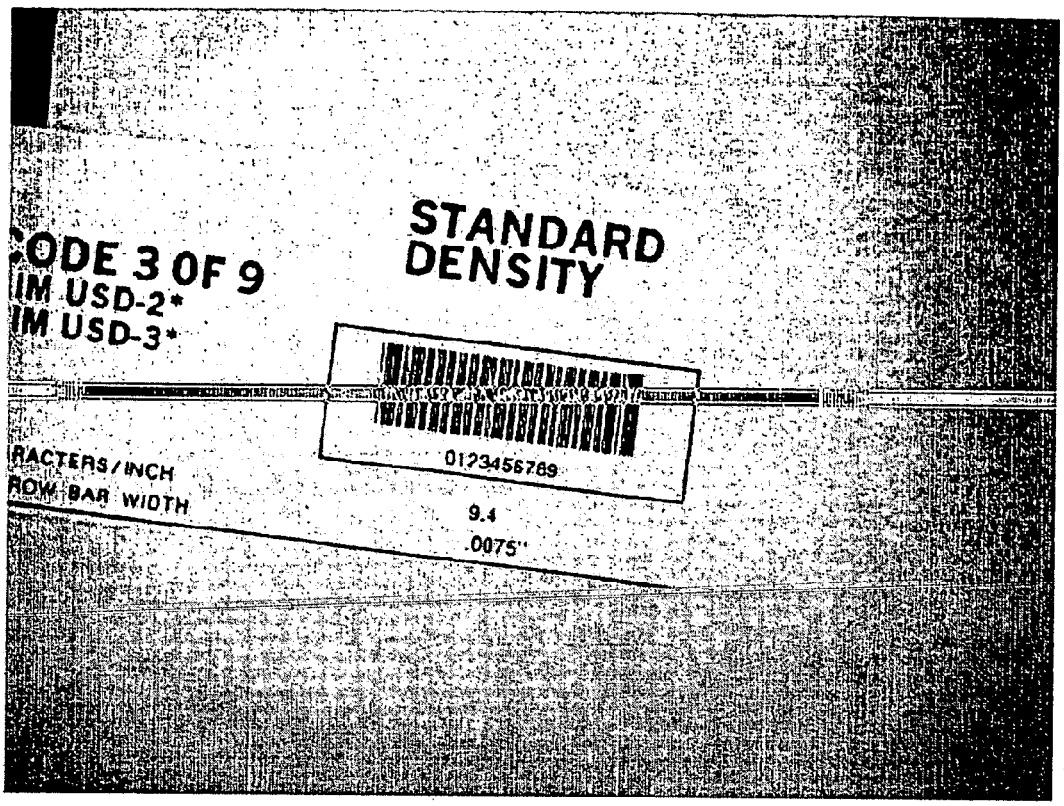
FIG. 4 is an example of an under-sampled scanned two-dimensional image.
Figure 5:
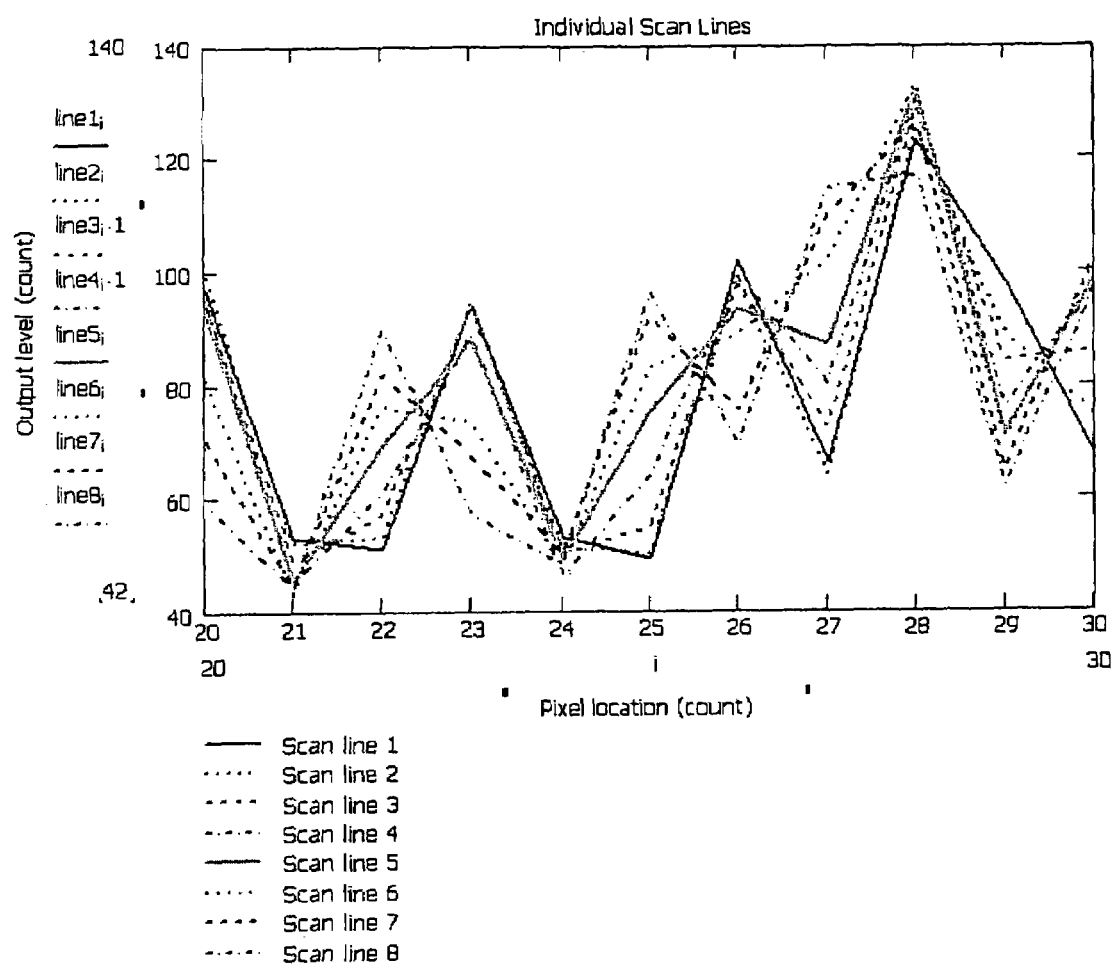
FIG. 5 is a graphical depiction of each of the scan lines depicted in FIG. 4.

FIGS. 3A-3B shows a data processing flow chart representative of the steps that might be used to realize one implementation of the invention. In steps 300, the bar code symbol is scanned and read into memory such that the data can be conveniently accessed for data processing. At step 304, multiple parallel scan lines are selected from the bar code image in such a pattern that the scan line are adjacent or near adjacent to each other and separated at regular intervals. The length of the scan lines is adjusted such that they all completely span only the bar code pattern of interest. The start and stop axes at both ends want to be parallel to each other. In one embodiment, eight (8) adjacent rows of data were taken. In one embodiment, the hardware imager is a 480×640 VGA array. An image of the bar code pattern 404 is shown in FIG. 4. The software identifies 8 adjacent scan lines taken through the image, each scan line being separated from the next by a vertical count of 1. The eight (8) adjacent scan lines 402 are so close together that they appear as a single line. The length of each scan line was adjusted to start in the left quiet zone 408 and end in the right quiet zone 410. Each scan line consists of I data points. Referring to FIG. 5, a graphical depiction 500 of a short segment of the scan lines depicted in FIG. 4 is shown. As expected, the various scan output lines 502 are slightly shifted relative to each other. Observe that at counts 24 and 25, scan lines 1, 2 and 3, designated as 501, 502 and 503, show a wider element while scan lines 6, 7 and 8, designated as 506, 507 and 508, show a narrower element. This is the result of insufficient spatial sampling.

In FIG. 3A step 308, the scan lines are expanded by interpolating a fixed number N of additional intermediate data points between each set of sampled data points. In this step, the N-interpolated data points are inserted between each of the I adjacent pixel pairs in each scan line at equally spaced sub-pixel positions. If each line originally had I pixels, each interpolated line includes I(N+1) sub-pixel values, the first and last sub-pixel values for each pair are thus identical in value to the pair values. The data point separation distance between sub-pixel values is substantially equal to the pair sample separation distance divided by N+1. Of course I and N are integer values. A linear interpolation is implemented for each of the N inserted points. Interpolation techniques other than linear might also be used such as band-limiting functions (using Sinc functions) or simply a hold function. In the example I is 199, N is chosen as 3 so that there are I(N+1) or sub-pixel values.

Mathematically this can be represented as $L1_i$=ith data point in the initial data array for line 1

$0 \leq i \leq I$ $LA1_j$=jth data point in the interpolated sub-pixel array for line 1

$0 \leq j \leq I \cdot (N+1)$

The interpolated sub-pixel data points for the first scan line can then be represented as shown below. The same operation is performed on all scan lines.

For $0 \leq n \leq N$ $LA1_{4i+n} = L1_i + (L1_{i+1} - L1_i) \cdot n/4$

In step 312 the average value is calculated for each scan line this is then subtracted from each value in the scan line. The same operation is performed on all scan lines.

$Avg1$ = average value for all values in row 1.

$$Avg1 = \frac{1}{I \cdot (N+1)} \cdot \sum_{i=0}^{I \cdot (N+1)-1} LA1_i$$

In step 316 the average is subtracted from each data element in each scan line. The resulting data array has a mean of zero and it can be shown that this reduces the offset of the cross-correlation results.

$LB1_j$=jth data point in the average reduced interpolated scan line 1

$LB1_j = LA1_j - Avg1$

In step 320, the cross-correlation functions are determined for each of the scan lines relative to the first scan line which is used as a reference line. The first scan line has been arbitrarily chosen as the reference scan line for cross-correlation with each of the other 7 scan lines. The cross-correlation is performed as a function of delay term $\tau$. In this fashion at each value of $\tau$ the cross-correlation function is calculated for each scan line relative to the reference scan line. The resulting number is a measure of the statistical similarity between the two scan lines for that specific delay. This suggests that if the data points from the two rows were properly arranged together with the second scan line shifter a delay equal to the $\tau$max corresponding to the maximum cross-correlation value, then the resulting combined scan lines are optimally aligned. Those skilled in the art will recognize that there are other mathematical tools that might be used to create a metric of similarity such as the sum and difference between the scan lines or the covariance function. Since in this way these two lines are in essence being aligned based upon the position of larger bar code elements, then the data points associated with the narrower bar code elements will also be properly aligned, even for the case where the data for the narrow elements may have been missing in one of the scan lines due to insufficient spatial sampling. The cross-correlation function can be calculated as shown below.

$\alpha 2_\tau$ = cross-correlation of interpolated average reduced scan line 2 with the interpolated average reduced scan line 1 at delay $\tau$ $$\alpha 2_\tau = \frac{1}{[I \cdot (N+1) - \tau]} \cdot \sum_{i=0}^{[I \cdot (N+1) - \tau - 1]} LB1_{i+\tau} \cdot LB2_i$$

$0 \leq \tau \leq 10$

Figure 6:
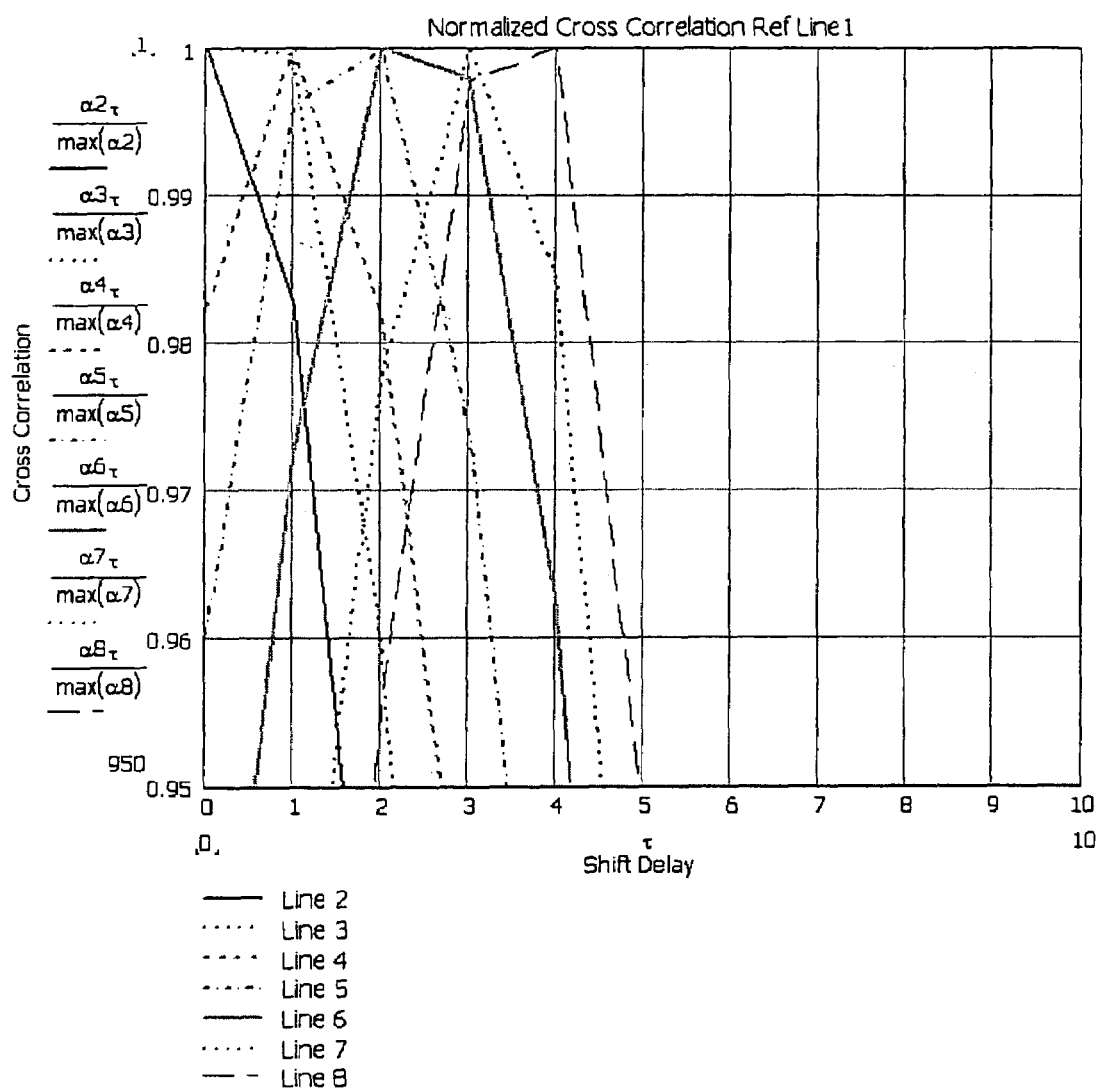
FIG. 6 is a graphical depiction of the normalized cross-correlation of each of the scan lines shown in FIG. 4 relative to a reference scan line.

Since we are interested in shifting the scan lines relative to each other by only one or two of the original data points, the maximum value of $\tau$ is limit to 10. In order to more conveniently evaluate the results, each of the cross-correlations results are then normalized to unity through division by the maximum value of the cross-correlation array. In FIG. 6, graph 600 shows the normalized cross-correlation graphs for the 8 scan lines considered in the example. Each shift delay (1-10) corresponds to an intermediate sub-pixel data point position. All cross-correlations use scan line 1 as the reference line.

Line 602 corresponds to the cross-correlation results of scan line 2
Line 603 corresponds to the cross-correlation results of scan line 3
Line 604 corresponds to the cross-correlation results of scan line 4
Line 605 corresponds to the cross-correlation results of scan line 5
Line 606 corresponds to the cross-correlation results of scan line 6
Line 607 corresponds to the cross-correlation results of scan line 7
Line 608 corresponds to the cross-correlation results of scan line 8

In step 324 the delay, $\tau$max, associated with each cross-correlation maximum is noted.
$\tau$2max=the delay at which the cross-correlation function for scan line 2 is a maximum
For the example considered these value are listed below.
$\tau$2max=0
$\tau$3max=0
$\tau$4max=1
$\tau$5max=1
$\tau$6max=2
$\tau$7max=3
$\tau$8max=3

For reconstitution purposes, it is preferred that only one scan line be associated with each delay. The preferred scan line can be chosen using a number of criteria, in the example considered, the preference is given to those scan lines that are most symmetric about $\tau$max. A symmetry metric can be developed by taking the absolute value of the difference between the cross-correlation results at the values for $\tau$ one below and one above the value of $\tau$max and normalizing this value through division by the cross-correlation value at $\tau$max.

$Sym2$ = Symmetry measure for the cross-correlation function of scan line 2 about the delay where $\tau = 1.0$.

$$Sym2 = \left| \frac{\alpha 2_{\tau 2max-1} - \alpha 2_{\tau 2max+1}}{\alpha 2_{\tau 2max}} \right|$$

The scan line having the lowest value for the Sym metric will correspond to the most symmetric line. Those scan lines that have a cross-correlation maximum at $\tau$=0 are assigned the value Sym=0. Similarly for those cases where there is only one scan line associated with a specific delay, there is no need to select a preference and these are also assigned a value Sym=0.

Clearly other techniques could be used, such as evaluating the slope on both side of the maximum and selecting that scan line where the absolute value of the slopes are most similar. This is done is step 328 of FIG. 3A. The numerical results for the chosen example are listed below. In step 332, the N−1 scan lines are selected that when appropriately align have the highest likelihood of inserting data points that were missing in the reference scan line because of insufficient spatial sampling. These selected 3 data lines for the example are noted below.

| | | |
|---|---|---|
| $\tau$2max = 0 | Sym2 = n/a | |
| $\tau$3max = 0 | Sym3 = n/a | |
| $\tau$4max = 1 | Sym4 = n/a | selected |
| $\tau$5max = 2 | Sym5 = 0.0218 | selected |
| $\tau$6max = 2 | Sym6 = 0.0252 | |
| $\tau$7max = 3 | Sym7 = n/a | selected |
| $\tau$8max = 4 | Sym8 = n/a | |

Figure 8:
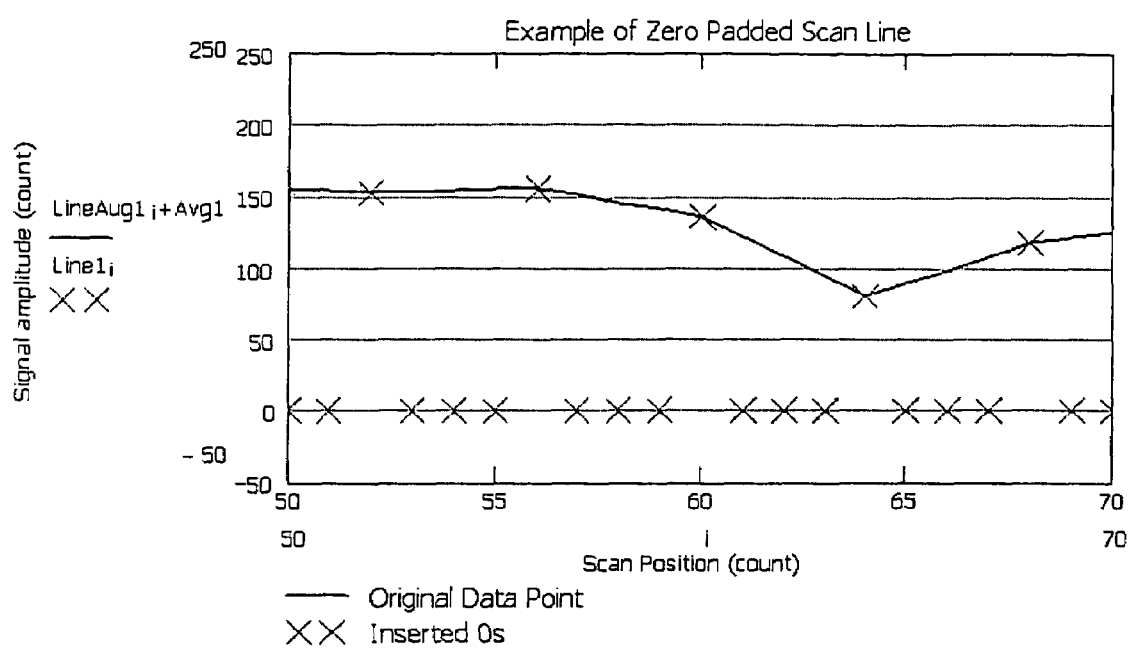
FIG. 8 is an example of a zero padded scan-line.

At this point the selection process is complete and now the reconstituted scan line with sub-pixel spatial resolution is created. In step 336, the original reference scan line and the N−1 additional selected scan lines are padded with N−1 zeros between each of the original data point. Referencing FIG. 8, data points 802 and 804 represent 2 data points in the initial data array for a scan line. Data points 806, 808 and 810 represent the 3 zero data points added to create the zero padded initial data array.

$LC1_j$=jth data point in the zero padded initial data array for line 1

$LC1_{4i} = L1_i$ $LC1_{4i+1} = 0$ $LC1_{4i+2} = 0$ $LC1_{4i+3} = 0$

In step 340, these scan lines are then appropriately shifted relative to the first scan line and summed such that each padded scan line fills in one of the position in the reference scan line with data. This is accomplished by shifting each of the padded selected scan lines by $\tau$max for that line and then summing all of the chosen shifted zero padded scan lines. This then creates the new reconstituted scan line with sub-pixel spatial resolution.

$LR_j$=jth data point in the reconstituted scan line

For the example shown the reconstituted scan line would be created as shown below.

$$LR_j = LC1_j + LC4_{j+1} + LC5_{j+2} + LC7_{j+3}$$

Figure 7:
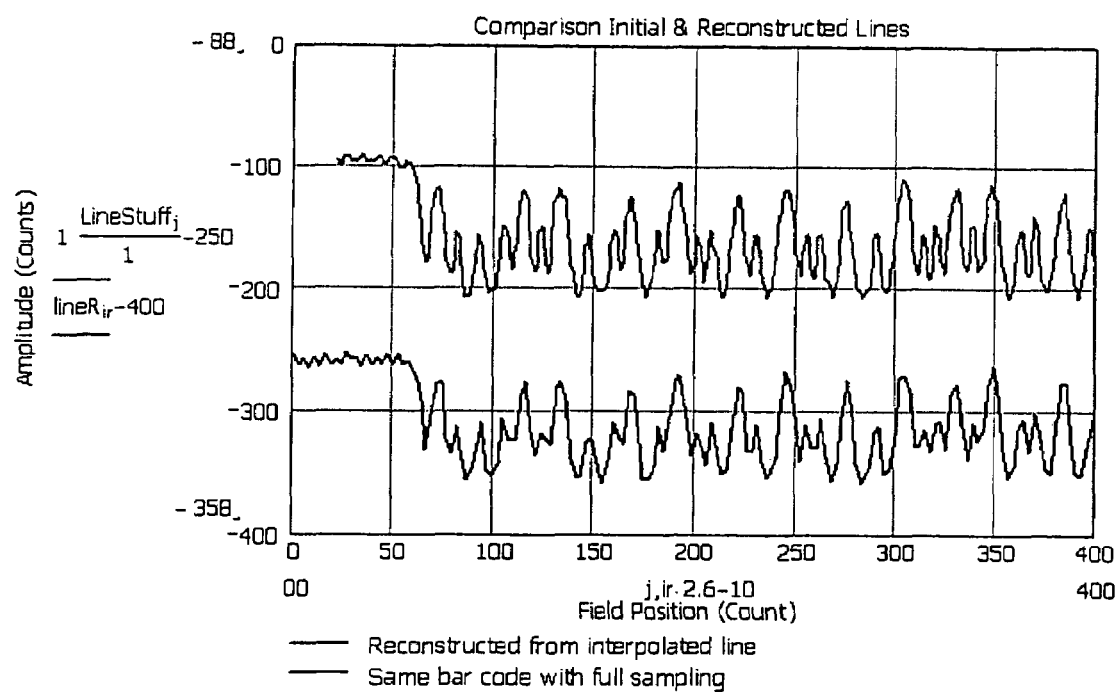
FIG. 7 is a graphical comparison of a under-sampled scan line with several reconstructed lines.

Referring to FIG. 7, three lines are shown. Line 702 is the one scan line of the original under-sampled image. Line 704 corresponds to the reconstituted scan line. Finally line 708 is from an adequately sampled image. This is the control used to determine the effectiveness of the present invention.

Alternately a reconstituted scan line could also be created by ignoring step 336 and summing the appropriately shifting the selected interpolated sub-pixel arrays directly. This can be termed a summed non-interpolated reconstituted scan line. For the example shown the summed non-interpolated reconstituted scan line would be created as shown below.

$$LR'_j = LA1_j + LA4_{j+1} + LA5_{j+2} + LA7_{j+3}$$

In step 344 the summed non-interpolated reconstituted scan with sub-pixel resolution is then output as a data file for input into a digitizer/decoder. This might be any of a number of hardware/software systems as are well known to those experienced in the bar code data processing industry.

In a second implementation, rather than using adjacent scan lines from the same image, two or more images might be used from the same or different imagers. These might not need to be successive images if the magnifications are similar. In an alternate implementation of the same concept, these multiple scan lines might be acquired by taking multiple lines, each traversing the bar code pattern at a different angle relative to the axis of the bar code pattern. In this case the length of each scan line will be different. In the case that the magnifications or line lengths are not the same, an appropriate magnification factor could be either calculated or measured and used to correct for the different line lengths. When this is done, the original scan line is linearly interpolated to a new scan line of the same length as the reference scan line. In this case the summed non-interpolated reconstituted scan line would be used because the original scan line is of the incorrect length.

Similarly these images might be taken with a 1D imager, such as the HHP ST5600 bar code scanner. In this case the relative motion between the scanner and the bar code symbol is utilized to obtain scan lines that are displaced from each other by a fraction of a sample interval.

Figure 9A:
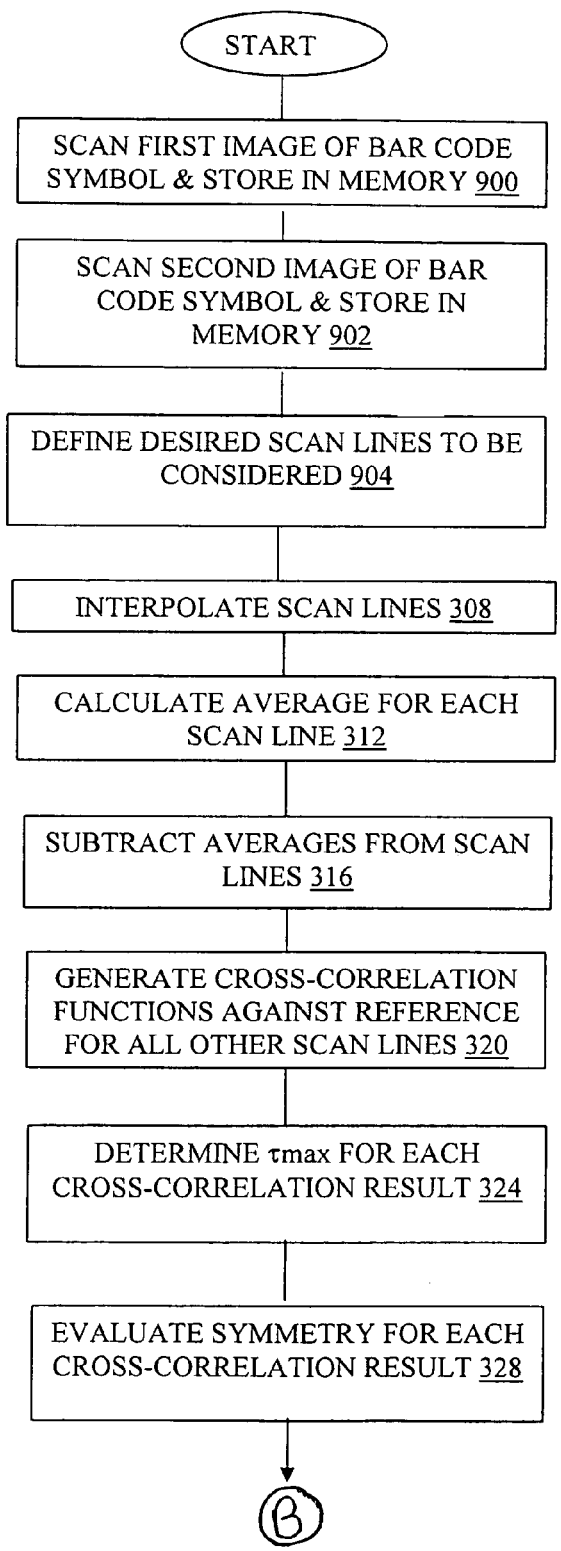
FIGS. 9A-9B are collectively a flow chart showing a method for reading a bar code symbol.
Figure 9B:
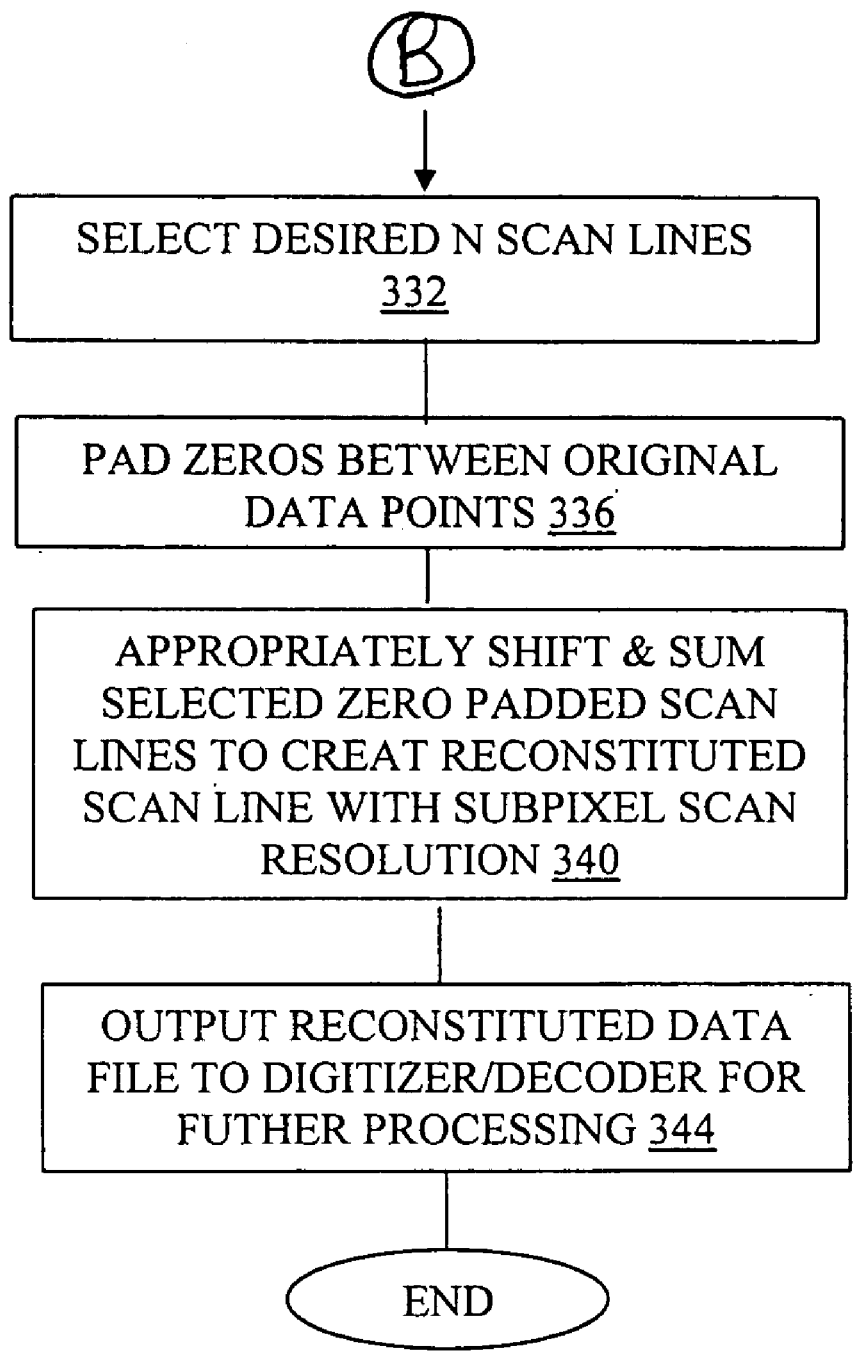

A flow diagram is shown in FIGS. 9A-9B. Two successive images are taken and stored in memory in steps 900 and 902. The desired scan lines are defined in step 904. The rest of the signal processing is identical to that of FIGS. 3A-3B discussed above.

In a third implementation, this technique might be used to increase the readability of images with excessive noise. In this case the cross-correlation function is used to align multiple scan lines in one or more images such that they can be summed. When signals contain various types of random noise, the signal level will usually increase proportional to the sum of the number of signals added whereas the noise will increase proportional to the square root of the number of signals added. The resultant scan signal will thus have an improved signal to noise when compared to any of the individual scan lines. In this case if the signal has adequately spatial sampling, one may not need to insert any sub-pixel data points, that is N=0. In this case the cross-correlation process is merely used to be assured that the scan lines to be summed are properly aligned with each other.

Figure 10A:
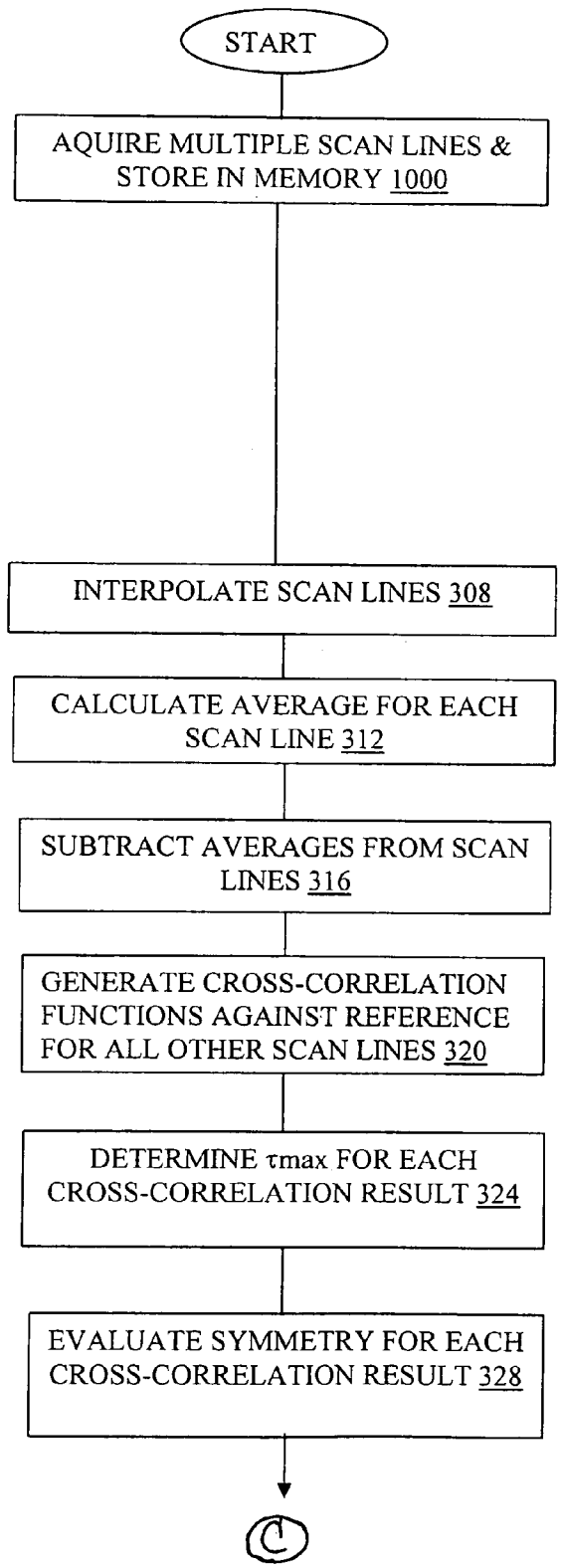
FIGS. 10A-10B are collectively a flow chart showing a method for reading a bar code symbol.
Figure 10B:
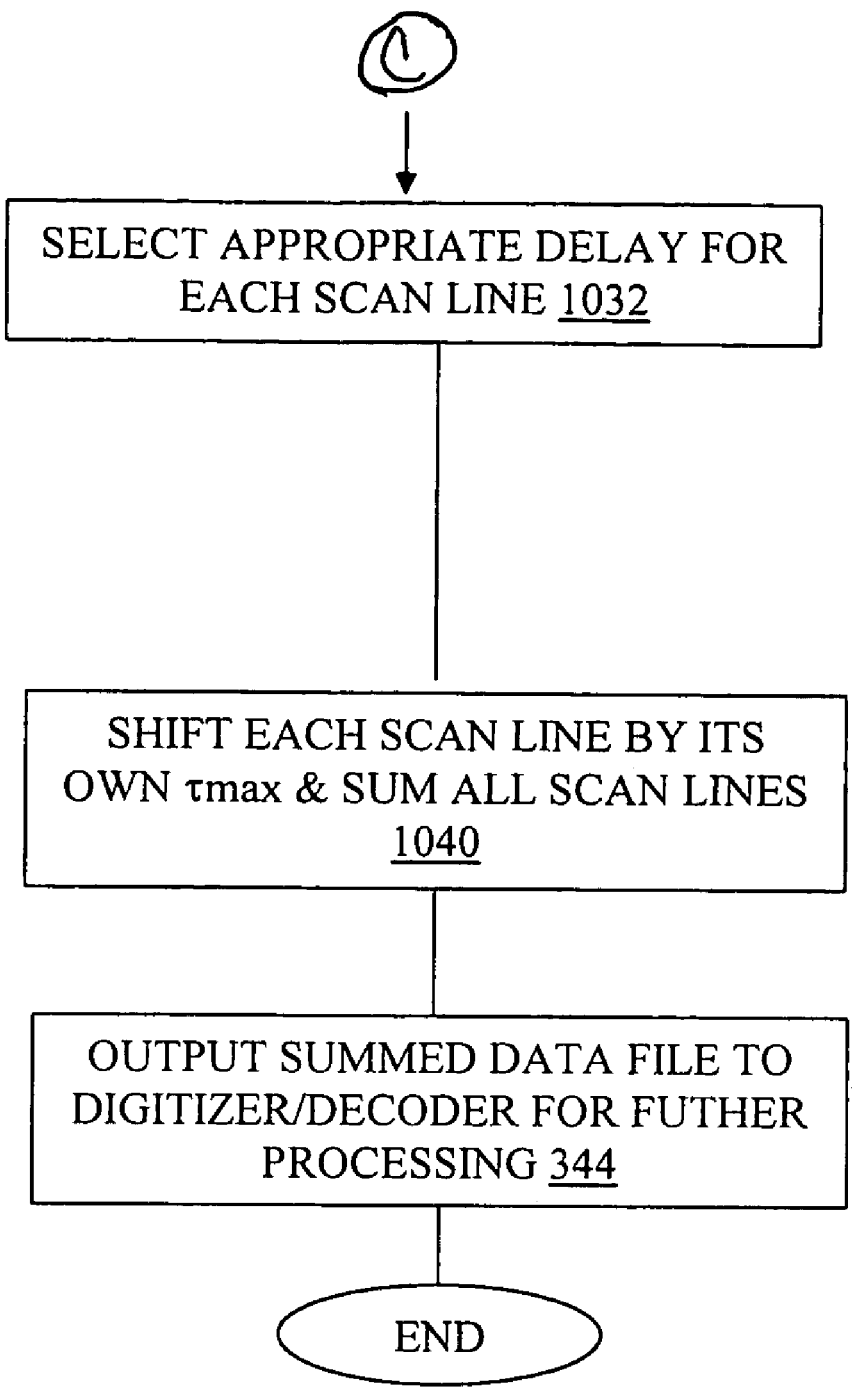

Such a system is described in the flow chart of FIGS. 10A-10B. At step 1000 the desired scan lines are acquired and stored in memory. Step 308 through step 328 are as described above. Note that at step 308, where the scan lines are interpolated, that N=0 is an allowed condition. At step 1032, all scan lines are selected. At step 1040 each interpolated scan lines is delayed by $\tau$max for that scan line and summed with all the other scan lines. If need be the results can be normalized through division by the number of scan lines used. Step 344 is as discussed above. In the case of images containing specular reflections where portions of the signal are obliterated by very bright directly reflected light the signal quality can be improved using this technique. These regions of specular reflection are easily identified because the returned signal amplitude is much larger than the surrounding signals can be detected by any one of a number of techniques. One such technique would be to establish a nominal white level for the scan line and then any region exceeding the amplitude of this scan line would be defined as being a region of specular reflection. The signal levels in these regions of specular reflection are set to zero and then during the summation process, the results for these regions of specular reflection would be normalized through division by only the number of scan lines actually contributing non-zero signal levels. In this fashion a reconstructed scan line can be created where the effects of secular reflection have been reduced.

Those skilled in the art will recognize that this same process could also be used with multiple images taken from multiple imagers.

Although all of the examples shown are for one dimensional bar code symbols, these same processes can also be implemented in 2 dimensions using the 2 dimensional cross-correlation function.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

We claim:

1. A method for reading a bar code symbol with an optical reader, the optical reader including a two-dimensional imager, the method comprising:

scanning the bar code symbol to obtain a plurality of scan lines, each of the plurality of scan lines including a linear array of pixel values, adjacent pixels in the linear array of pixel values being separated by a sample separation distance;

designating one of the plurality of scan lines as a reference scan line;

inserting a pre-defined number of interpolated data points between each adjacent pixel pair in each of the plurality of scan lines to form a plurality of interpolated scan lines;

for each scan line of said plurality of interpolated scan lines, determining a plurality of values of a cross-correlation function relative to said reference scan line, said each scan line being shifted by a shift value, said plurality of values of a cross-correlation function corresponding to a plurality of shift values from a pre-defined range;

determining an optimum delay value for each interpolated scan line, the optimum delay value yielding a maximum of said cross-correlation function of the interpolated scan line and the interpolated reference line;

choosing one or more selected interpolated scan lines from the plurality of interpolated scan lines;

adding a pre-defined number of zero pixel values between each pair of said pixel value for each scan line of said plurality of scan lines;

selecting a spatial shift amount for each selected interpolated scan line, the spatial shift amount being the integer multiple of the sample separation distance that corresponds to the optimum delay value for the selected interpolated scan line;

shifting each of the selected interpolated scan lines relative to the reference line by its corresponding spatial shift amount to obtain a plurality of shifted scan lines creating a reconstructed scan line by summing said pixels of said shifted scan lines.

2. The method of claim 1, wherein said reconstructed scan line has a sub-pixel spatial resolution.

3. The method of claim 1, wherein each scan line of said plurality of scan lines has a starting point; wherein said plurality of scan lines is selected so that said starting points are shifted by a fraction of said sample separation distance.

4. The method of claim 1, wherein said pixel sample separation distance is greater than or approximately equal to a width of the narrowest bar code symbol feature.

5. The method of claim 1, wherein said step of inserting a pre-defined number of interpolated data points is followed by calculating an average value for each of said scan line and subtracting said average value from each pixel value of said scan line.

6. The method of claim 1, wherein said plurality of scan lines is acquired from two or more images.

7. The method of claim 1, wherein said bar code symbol has an axis; and wherein each scan line of said plurality of scan lines traverses said bar code symbol at a different angle relative to said axis of said bar code symbol.

8. A system for reading a bar code symbol with an optical reader, said system comprising:

an imaging assembly configured to scan said bar code symbol to acquire a two-dimensional image of said bar code symbol, said bar code image comprising a first plurality of scan lines, each scan line including a linear array of pixel values; and a processor coupled to said imaging assembly, said processor being programmed to produce a plurality of interpolated scan lines by inserting a pre-defined number of interpolated data points between each pair of adjacent pixels;

said processor being further programmed to add a pre-defined number of zero pixel values between each pair of said pixel values for each scan line of said first plurality of scan lines; and said processor being further programmed to create a reconstructed scan line by adding said pixel values of a plurality of shifted scan lines, said plurality of shifted scan lines produced by shifting by an optimum shift value each scan line of a second plurality of scan lines selected from said first plurality of scan lines, said optimum shift value yielding a maximum of a cross-correlation function for said scan line relative to a reference scan line, said reference scan line selected from said plurality of interpolated scan lines.

9. The system of claim 8, wherein said reconstructed scan line has a sub-pixel spatial resolution.

10. The system of claim 8, wherein each scan line of said plurality of scan lines has a starting point; wherein adjacent pixels of each scan line of said plurality of scan lines are separated by a sample separation distance; and wherein said plurality of scan lines is selected so that said starting points are shifted by a fraction of said sample separation distance.

11. The system of claim 8, wherein said processor is further configured, after inserting a pre-defined number of interpolated data points, to calculate an average value for each said scan line and subtract said average value from each pixel value of said scan line.

12. The system of claim 8, wherein said plurality of scan lines is acquired from two or more images.

13. The system of claim 8, wherein said bar code symbol has an axis; and wherein each scan line of said plurality of scan lines traverses said bar code symbol at a different angle relative to said axis of said bar code symbol.

14. A method for reading a bar code symbol with an optical reader, said bar code symbol containing one or more specular reflections, said method comprising the steps of:

scanning said bar code symbol to acquire a two-dimensional image of said bar code symbol, said bar code image comprising a plurality of scan lines, each of said plurality of scan lines including a linear array of pixel values;

establishing a nominal white level of a scan line;

selecting one or more specular reflection pixels with pixel values exceeding said nominal white level;

setting pixel values of said specular reflection pixels to zero;

inserting a pre-defined number of interpolated data points between each pair of adjacent pixels, to produce a plurality of interpolated scan lines;

designating one of said plurality of interpolated scan lines as a reference scan line;

for each scan line of said plurality of interpolated scan lines, determining a plurality of values of a cross-correlation function relative to said reference scan line, said each scan line being shifted by a shift value, said plurality of values of a cross-correlation function corresponding to a plurality of shift values from a pre-defined range;

determining an optimum delay value for each scan line of said plurality of interpolated scan lines, said optimum shift value yielding a maximum of said cross-correlation function for said scan line;

selecting one or more scan lines from said plurality of scan lines to produce a plurality of selected scan lines;

shifting each scan line of said plurality of selected scan lines by said optimum delay value, to produce a plurality of shifted scan lines; and creating a reconstructed scan line by summing said pixel values of said shifted scan lines followed by normalizing each resulting pixel value.

* * * * *